Dec. 16, 1924.  1,519,665
A. B. CHARLES
INTAKE MANIFOLD FOR GASOLINE PROPELLED VEHICLES
Filed Nov. 25, 1922

Inventor
A.B.Charles

By
Attorney

Patented Dec. 16, 1924.

1,519,665

UNITED STATES PATENT OFFICE.

ALBERT B CHARLES, OF BLUE MOUND, KANSAS.

INTAKE MANIFOLD FOR GASOLINE-PROPELLED VEHICLES.

Application filed November 25, 1922. Serial No. 603,320.

*To all whom it may concern:*

Be it known that ALBERT B CHARLES, a citizen of the United States, residing at Blue Mound, in the county of Linn and State of Kansas, has invented certain new and useful Improvements in Intake Manifolds for Gasoline-Propelled Vehicles, of which the following is a specification.

This invention has reference to a manifold attachment for internal combustion engines embodying means for effecting atomization of the gaseous charge as it passes into the manifold from the carbureter.

An object of the invention is to provide means of the above character which will not only have a tendency to break the charge into fine particles but which will also carry the heat into the center where it is more effective, the said charge being given a twirling motion as it passes through the manifold.

Various other objects and advantages of the invention may become apparent from the following disclosure.

Figure 1:
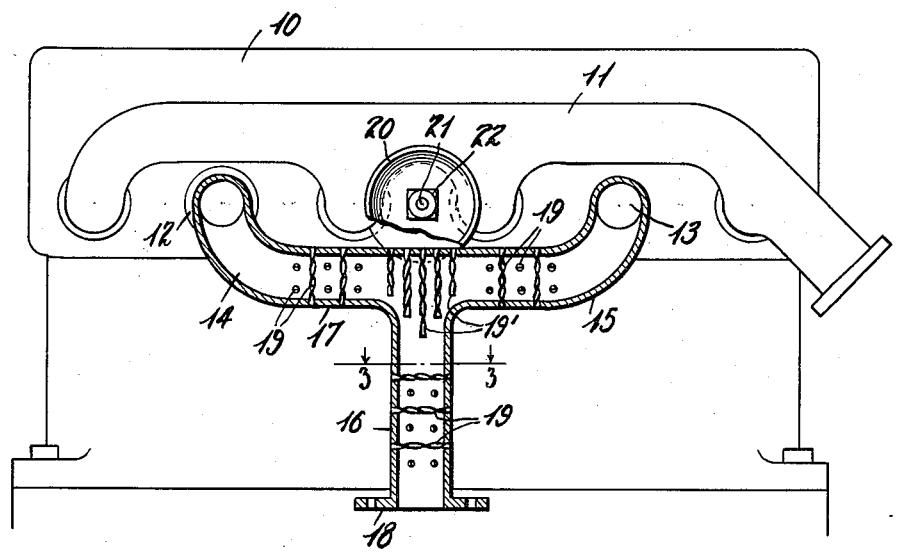
Figure 1 is a side view of an engine cylinder with the manifold attachment applied thereto.

Describing the invention in detail, 10 designates an engine cylinder of conventional type having an exhaust manifold 11 and intake ports 12 and 13 respectively. Connecting with the intake ports are the terminal portions 14 and 15 of the manifold attachment which may be constructed in a single piece and which embodies a vertical tubular portion 16 integrally united with a horizontal portion 17 arranged transversely of its upper end as shown, whereby a unitary manifold case is provided as illustrated in Figure 1.

Figure 4:
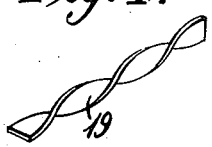
Figure 4 is a detailed view of one of the spirally twisted cross rods of the manifold.

At its lower ends, the tube 16 is formed with a securing flange 18 providing means for attaching a carbureter to the manifold and in order that the gaseous charge may be broken up into fine particles and caused to become thoroughly mixed as it passes through the manifold, the latter is provided with a plurality of spirally twisted rods 19, as shown in Figure 4.

Figure 3:
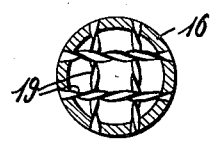
Figure 3 is a cross section through the manifold as taken along line 3—3 of Figure 1.

Rods 19 are arranged crosswise of the manifold, preferably in superposed pairs extending at right angle to each other as shown in Figure 3, thereby providing abutments against which the gasoline strikes and by which it is broken up into finer particles. The twist in the cross rods has a tendency to cause the air and gasoline of the charge to mix more thoroughly by giving the air a twisted or twirling motion as it passes through the manifold. There are preferably three of such groups of cross rods provided in the manifold, one group being located in the tubular portion 16 approximately midway of its upper and lower ends, and the other groups being arranged within the horizontal portion 17 and on opposite sides of the tubular portion, as will be understood from Figure 1. An additional group is, however, provided in the horizontal portion 17 and consists of twisted rods 19' depending from the upper walls of the horizontal portion at a central point so as to partly obstruct the upper or mouth end of tube 16. It will thus be seen that the gaseous charge is obstructed at various stages in its passage by these groups of twisted rods and is, hence, admitted to the cylinder in a highly volatilized state whereby a better operation of the engine is obtained at a minimum expenditure of gas than is possible without the attachment.

Figure 2:
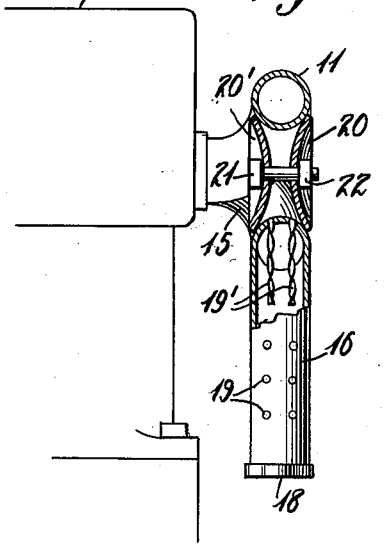
Figure 2 is an end view thereof.

In order that the fuel may be heated while in the attachment, a pair of concavo-convex disks 20 and 20' are clamped between the exhaust manifold 11 and the horizontal portion 17 of the manifold attachment, the clamping being preferably accomplished by means of a bolt 21 passing centrally through the plates as shown in Figure 2 and fastened thereto by means of a nut 22. The disks are spaced apart to provide an intervening space therebetween whereby the heat radiating from the exhaust manifold may, in part, be directed against manifold 17 and communicated to rods 19', the heat of the said rods of the manifold serving to accelerate the volatilization of the gaseous charge, as will be readily understood.

Although the above has reference to the preferred embodiment of the invention it is to be understood that the same is not to be restricted to the precise details of construction herein set forth but that various modifications in the arrangement and construction of the cross rods and the manifold casing may be resorted to within the scope of the invention claimed.

From the foregoing it is thought that the advantages and novel features of the invention can be readily understood and that further detailed description thereof is not required.

What is claimed is—

1. A mixture splitter comprising a manifold, a group of spaced rods depending from the upper wall thereof, said rods being twisted and disposed opposite and parallel with the axis of the mixture intake opening of the manifold and a group of cross rods interposed between the first mentioned group of rods and the intake opening of the manifold.

2. A mixture splitter comprising a manifold, a group of spaced rods depending from the upper wall thereof, said rods being twisted and disposed opposite and parallel with the axis of the mixture intake opening of the manifold, a group of cross rods interposed between the first mentioned group of rods and the intake opening of the manifold and a group of cross rods interposed between the first mentioned group of rods and the outlet opening of the manifold.

3. A mixture splitter comprising an intake manifold, a group of spaced rods extending crosswise of the manifold adjacent the intake opening thereof, a group of spaced rods extending crosswise of the manifold adjacent the outlet opening thereof, and a group of spaced rods between the first and second mentioned groups and disposed opposite to, and parallel with the axis of, the intake opening of the manifold, each of said rods presenting a spiral groove for imparting a twirling movement to the mixture passing through the manifold.

4. A mixture splitter comprising an intake manifold, a group of spirally twisted rods arranged crosswise of the manifold adjacent the intake opening thereof in spaced pairs extending at right angles to each other, a group of spirally twisted rods arranged crosswise of the manifold adjacent the outlet opening thereof and in spaced pairs extending at right angles to each other, and a group of spirally twisted rods arranged between the first and second mentioned groups and disposed opposite to, and parallel with the axis of, the intake opening of the manifold.

5. A mixture splitter comprising a manifold presenting a vertical intake portion and a horizontal outlet portion arranged transversely of the upper end of the intake portion, means adjacent the mixture intake opening of the said intake portion of the manifold for imparting twirling movement to the mixture in a direction at right angles to the axis of the intake portion, means at the junction of the said intake and outlet portions of the manifold for imparting twirling movement to the mixture in a direction parallel to the axis of intake portion, means adjacent each outlet opening of the said horizontal portion of the manifold for imparting a twirling movement to the mixture in a direction at right angles to the axis of the said horizontal portion of the manifold.

In testimony whereof I affix my signature.

ALBERT B CHARLES.